(12) United States Patent
Ma et al.

(10) Patent No.: US 6,674,919 B1
(45) Date of Patent: Jan. 6, 2004

(54) METHOD FOR DETERMINING THE SKEW ANGLE OF A TWO-DIMENSIONAL BARCODE

(75) Inventors: Yue Ma, West Windsor, NJ (US); Jinhong Guo, West Windsor, NJ (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/400,242

(22) Filed: Sep. 21, 1999

(51) Int. Cl.⁷ .................................................. G06K 9/36
(52) U.S. Cl. ........................ 382/289; 382/199; 382/306
(58) Field of Search ................................. 382/289, 296, 382/306, 199, 168, 171, 172; 235/462.1, 462.9

(56) References Cited

U.S. PATENT DOCUMENTS

| | | | | |
|---|---|---|---|---|
| 5,083,214 A | * | 1/1992 | Knowles ..................... 358/403 |
| 5,101,096 A | | 3/1992 | Ohyama et al. ............. 235/436 |
| 5,204,515 A | | 4/1993 | Yoshida ....................... 235/456 |
| 5,233,168 A | | 8/1993 | Kulik ........................... 235/456 |
| 5,343,031 A | * | 8/1994 | Yoshida ....................... 235/494 |
| 5,360,968 A | | 11/1994 | Scott ........................... 235/454 |
| 5,517,587 A | * | 5/1996 | Backer et al. ............... 382/296 |
| 5,521,368 A | | 5/1996 | Adachi ........................ 235/462 |
| 5,616,905 A | | 4/1997 | Sugiyama .................... 235/456 |
| 5,625,721 A | | 4/1997 | Lopresti et al. ............. 382/309 |
| 5,664,027 A | * | 9/1997 | Ittner .......................... 382/170 |
| 5,703,972 A | | 12/1997 | Lopresti et al. ............. 382/310 |
| 5,748,807 A | | 5/1998 | Lopresti et al. ............. 382/310 |
| 5,825,015 A | | 10/1998 | Chan ............................ 235/494 |
| 5,854,478 A | | 12/1998 | Liu et al. ..................... 235/462 |
| 5,862,267 A | | 1/1999 | Liu ............................. 382/291 |
| 5,862,270 A | * | 1/1999 | Lopresti et al. ............. 382/306 |
| 6,082,619 A | | 7/2000 | Ma et al. ..................... 235/462.1 |
| 6,201,901 B1 | | 3/2001 | Zhou et al. .................. 382/306 |
| 6,285,802 B1 | * | 9/2001 | Dennis et al. ............... 382/280 |

OTHER PUBLICATIONS

William H. Press, Saul A. Teukolsky, William T. Vetterling, and Brian P. Flannery, Numerical Recipes in C, Chapter 15.2, pp. 661–6, 1992.

* cited by examiner

Primary Examiner—Yon J. Couso
(74) Attorney, Agent, or Firm—Amster, Rothstein & Ebenstein LLP

(57) ABSTRACT

A method of calculating a skew angle for a two-dimensional barcode, in which the horizontal or vertical edges within the barcode are located, preferably using a finite state recognizer, and an edge array identifying the horizontal or vertical edges is generated. Next, the edge lines within the edge array are identified and traced, and any segments of edge lines within the edge array which are perpendicularly connected are separated. The slope for each edge line within the edge array is calculated, preferably using linear regression techniques. In the preferred embodiment, a discrete histogram of the slopes is generated and the skew angle is then set as the highest value within the discrete histogram. In a preferred embodiment, edge lines within the edge array which are located within a first predetermined threshold of each other are merged with each other and edge lines within the edge array having a length less than a second predetermined threshold are eliminated from the edge array to speed processing. Other techniques for analyzing the edge line slopes are also presented.

18 Claims, 10 Drawing Sheets

METHOD FOR DETERMINING THE SKEW ANGLE OF A TWO-DIMENSIONAL BARCODE

FIELD OF THE INVENTION

The invention relates generally to an improved method for determining the skew angle of a two-dimensional barcode printed within an image.

BACKGROUND OF THE INVENTION

As fully described in U.S. Pat. Nos. 5,625,721 and 5,703,972 to Lopresti et al. which are both entitled "Certifiable Optical Character Recognition" and in U.S. Pat. No. 5,748,807 entitled ."A Method and Means For Enhancing Optical Character Recognition of Printed Documents", the contents of which are all explicitly incorporated by reference herein, information about the contents, layout, generation and retrieval of a document can be encoded by a computer when initially generating the document or upon subsequent computer processing thereof. The encoded document information can then be provided via a two-dimensional barcode, generated on the face of a printed version of the document. For example, FIG. 1A shows a two-dimensional barcode 10 printed in the lower right corner of a document 11 containing mostly text 12, and FIG. 1B shows an example of a two-dimensional barcode 20 comprising a plurality of black and white bits 23 arranged in a 20 bit×20 bit array of data.

Advanced encoding and print resolution capabilities presently available can accommodate up to 30,000 bits of information in a single square inch of space. Therefore, as taught by the above-referenced patents, one can theoretically encode the entire document contents, limited only by the amount of space on the document face that one is willing to sacrifice to the two-dimensional barcode. A barcode scanner, in conjunction with or wholly separate from an optical page scanner, can scan the two-dimensional barcode and provide the information to an associated system equipped with the appropriate recognition and decoding software. The decoded information can then be used by the scanning system to create a new version of the document or to enhance the recognition, reproduction and error correction for the scanned document. To decode the two-dimensional barcode, it is not required that such barcode scanner and scanning system know the printing resolution of the two-dimensional barcode, provided that the scanning resolution of the scanner is able to establish at least a 3×3 pixel matrix for each logical bit of the two-dimensional barcode.

However, difficulties are encountered when attempting to read a two-dimensional barcode on a document which was not properly aligned when scanned, because of the resulting skew angle of the two-dimensional barcode (i.e., the angle between the page as scanned and the ideal alignment). Several methods have been proposed for correcting the skew angle of a scanned two-dimensional barcode, but each has certain drawbacks, as discussed below.

U.S. Pat. No. 5,862,270 discloses a method for deskewing a two-dimensional barcode that relies on, and therefore requires, the presence of a border on at least one side of the barcode, and which is only effective for barcodes scanned at "slight" offset angles.

In U.S. patent application Ser. No. 09/088,189 ("the '189 Application"), the contents of which are hereby incorporated by reference, two alternate methods are presented for deskewing a two-dimensional barcode. The first method presented in the '189 Application is a template matching procedure which requires that the barcode include corner bits (also called anchor bits) which are all the same color and contrast with the background color of the document. The second method disclosed in the '189 Application does not require corner bits in the two-dimensional barcode, and is a two-step process which first creates an edge image containing all edge pixels within the two-dimensional barcode (either horizontal edge pixels or vertical edge pixels) by applying edge masks, as described in detail in the '189 Application. The edge pixels represent the "edges" between data bits of a first color (e.g., black) and data bits of a second color (e.g., white). The Hough Transform is then applied to the edge image to determine the dominant straight line in the edge image. The skew of the two-dimensional barcode is the angle between this dominant straight line and a horizontal or vertical line. Although the method of the '189 Application produces reliable results, the processing required by application of the edge masks to the two-dimensional barcode was less than optimal.

In U.S. patent application Ser. No. 09/212,243 ("the '243 Application"), the contents of which are hereby incorporated by reference, a finite state recognizer is used to create the edge image, which greatly reduces the processing time over the edge mask step of the '189 Application since each pixel within the two-dimensional barcode is examined only once. In addition, the edge image is divided into a number of regions, and the Hough Transform is applied to each region, with the skew angle being selected by a voting scheme among the angles found in each region to determine the proper skew angle. This approach reduces the effect of drawn line noise across the two-dimensional barcode. The method of the '243 Application reduces the processing time over the method of the '189 Application and reduces errors caused by drawn line noise on the two-dimensional barcode. However the processing time required to perform the Hough Transform was such that only a small range of skew angles could be considered while maintaining a reasonable processing speed.

It is therefore an object of the present invention to provide an improved method of calculating the skew angle of a two-dimensional barcode printed on a printed medium.

It is an additional object of this invention to provide a method of calculating the skew angle of a two-dimensional barcode printed on a printed medium which reduces the processing time required for the edge image.

It is yet another object of this invention to provide a method of calculating the skew angle of a two-dimensional barcode printed on a printed medium which increases the range of skew angles located within a reasonable processing time.

It is yet a further object of this invention to provide a method of calculating the skew angle of a two-dimensional barcode printed on a printed medium which greatly reduces the effect of drawn line noise on the barcode.

Various other objects, advantages and features of the present invention will become readily apparent from the ensuing detailed description and the novel features will be particularly pointed out in the appended claims.

SUMMARY

The present invention is directed to a method of calculating a skew angle for a bitmap of rows and columns of data pixels, such as a two-dimensional barcode. This method first locates the horizontal or vertical edges within the bitmap and generates an edge array identifying the horizontal or vertical edges. Next, the edge lines within the edge array are identified and traced, and then, preferably, any segments of the edge lines within the edge array which are perpendicularly connected are separated. The slope for each edge line within the edge array is calculated and, in the preferred embodiment, a discrete histogram of the slopes is generated. Finally the skew angle is set as the highest value within the discrete histogram. Since the slope is calculated for a plurality of lines within the edge image derived from the bitmap, the effect of drawn line noise is greatly diminished, since its contribution to the histogram will be much less than the edge lines.

In the preferred embodiment, a finite-state recognizer is used to locate the horizontal or vertical edges and create the edge array. Also, edge lines within the edge array which are located within a first predetermined threshold of each other are merged after the edge lines have been identified and traced. In addtion, edge lines within the edge array having a length less than a second predetermined threshold are eliminated to improve processing time and to ensure accuracy of the calculated skew angle. Finally, the slope of each edge line in the edge array is calculated using linear regression techniques.

BRIEF DESCRIPTION OF THE DRAWINGS

The above and related objects, features and advantages of the present invention will be more fully understood by reference to the following detailed description of the presently preferred, albeit illustrative, embodiments of the present invention when taken in conjunction with the accompanying drawing wherein.

DETAILED DESCRIPTION OF THE PREFERRED EMBODIMENTS

Figure 1A:
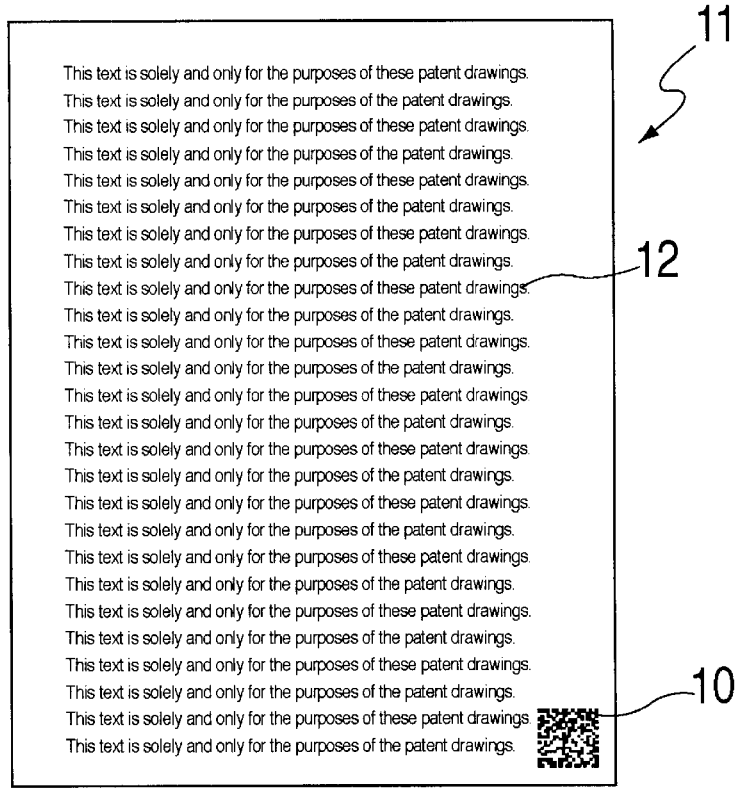
FIG. 1A is a diagram schematically illustrating a two-dimensional barcode printed on a page of printed text.
Figure 1B:
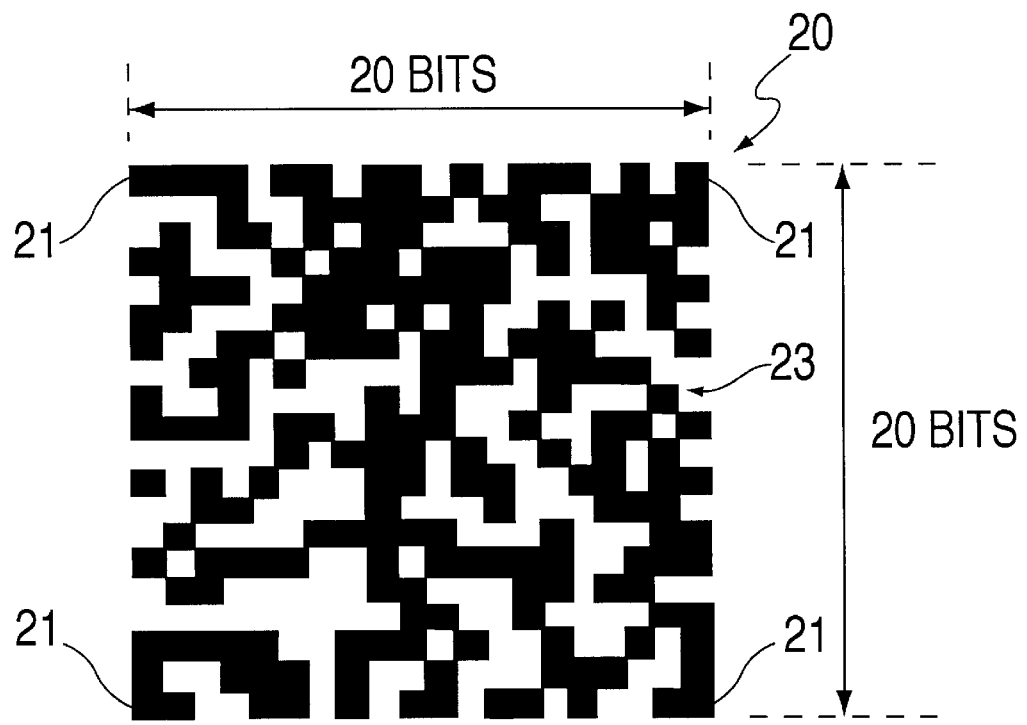
FIG. 1B shows an example of a two-dimensional barcode used in accordance with the present invention.

Referring now to the drawing, and in particular, FIG. 1B, which illustrates an example of the two-dimensional barcode symbology introduced in the '189 Application. Two-dimensional barcode 20 comprises an encoded set of data bits in a two-dimensional grid. Typically, each data bit which is encoded is printed as a matrix of black or white pixels 23. Preferably, a pixel matrix representing one data bit is square and may be as small as a 1×1 matrix to as large as a 6×6 matrix or more. Non-square matrices may also be used. There are no clocks or borders needed or required in the symbology for two-dimensional barcode 20. In the preferred embodiment, the two-dimensional barcode 20 is a 20×20 array of data bits, with each bit stored in a 9×9 pixel matrix, although it can be recognized that the size is flexible and that the only requirement on the size is that the reading process know the size of the encoded array.

Two different embodiments of the barcode symbology are described in the '189 Application. In the first embodiment, the four corner bits 21 are always black (when printed on a white background). The four corner bits 21 in the first embodiment are called "anchor" bits. The remaining data bits in the first embodiment of the '189 Application are pseudo-randomized and can hold any combination of desired information and error correction bits. The symbology of the first embodiment provides for good skew estimation when the skew is small and the two-dimensional barcode 20 is free from any damage. However, the placement of the anchor bits 21 in the corner makes them susceptible to damage. Thus, in the second embodiment described in the '189 Application, there is no requirement for anchor bits 21 and the two-dimensional barcode 20 is simply a N×M array of data bits, preferably with N=M=20, in which case providing for the storage of up to 50 bytes (400 bits) of information. In the second embodiment, all of the data bits are pseudo-randomized and can hold any combination of desired information and error correction bits.

Figure 2:
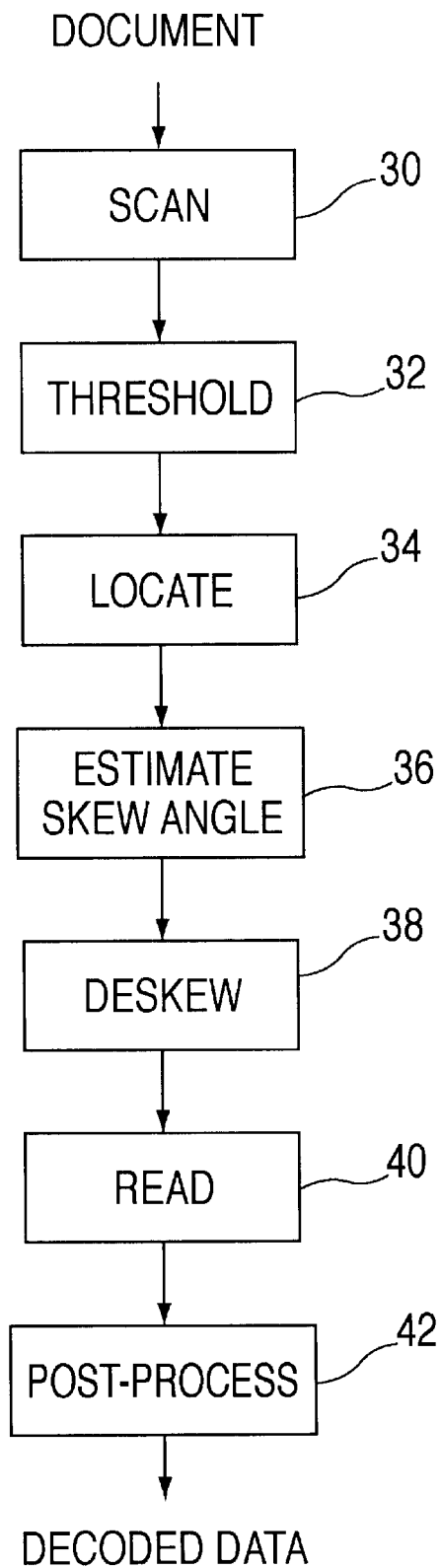
FIG. 2 is a flowchart describing the steps required in reading a two-dimensional barcode from a document.

The flowchart of FIG. 2 illustrates the steps involved in the decoding process for a two-dimensional barcode printed on a document. Except as discussed herein with respect to the methods of the present invention, the processing required for each of the steps in FIG. 2 is more particularly described in the '280 Application and/or in the '189 Application. During the decoding process, the document containing the two-dimensional barcode printed thereon is scanned at step 30. The scanned image is then subjected to a thresholding step 32 (i.e., the pixel-based gray-scale image created by the scanning process is converted to a binary, e.g., black and white, image), the two-dimensional barcode is located within the scanned image at step 34, the skew angle of the two-dimensional barcode is estimated at step 36, the two-dimensional barcode is deskewed at step 38, the bits within the two-dimensional barcode are read at step 40, and post-processing (e.g., error-correction) is performed at step 42. In particular, the method of the present invention is used as part of the skew angle estimation step 36.

Figure 3B:
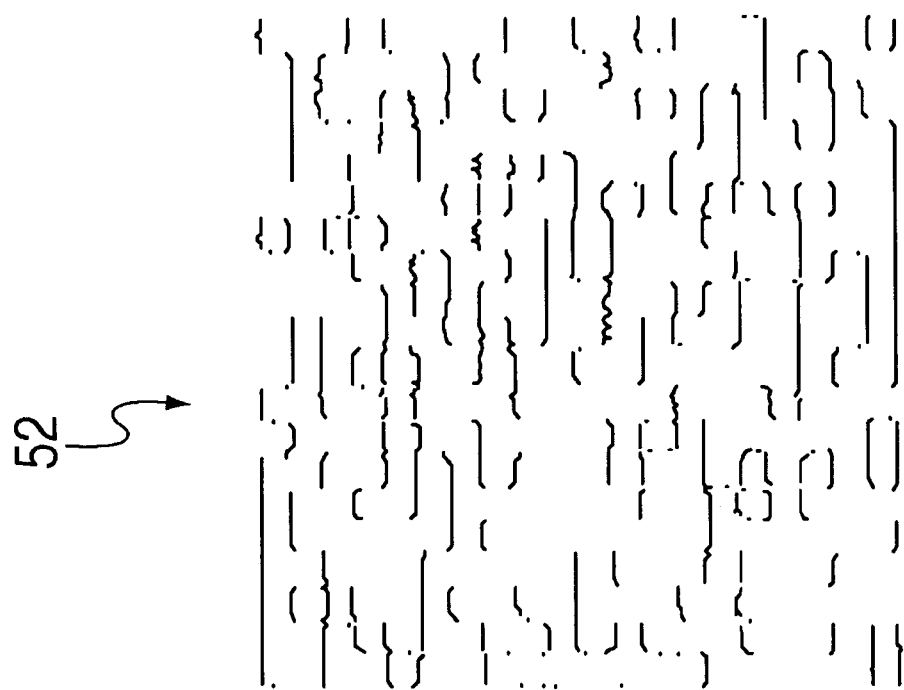
FIG. 3B is a diagram showing the horizontal edge image derived from the scanned two-dimensional barcode of FIG. 3A.
Figure 3A:
FIG. 3A is an example of a scanned two-dimensional barcode.

The present invention operates on an edge image, such as edge image 52 in FIG. 3B, which, in the preferred embodiment, is generated by the finite state recognizer disclosed the '243 Applicaton. As disclosed in the '243 Patent, an edge pixel is defined as a first sequence of at least N pixels in a first color followed by a second sequence of at least N. pixels of the opposite color. The finite state recognizer of the '243 Patent processes a scanned two-dimensional barcode (e.g., barcode 50 in FIG. 3A) to generate an edge image (e.g. the horizontal edge image 52 of FIG. 3B) comprised of edge pixels., As one of reasonable skill in the art will readily recognize, various other methods are available for generating the edge image from the scanned two-dimensional barcode, including the edge mask method disclosed in the '189 Patent, although the finite state recognizer method has been found to offer the best performance in terms of processing time.

The method of the '243 Patent employed the Hough Transform in combination with a voting scheme to determine the skew angle of the edge image, whereas the method of the present invention identifies all eligible (i.e., meeting certain predetermined criteria) straight lines within an edge image, estimates the slope of each identified straight line and then determines the skew angle based on the distribution of the calculated slopes.

Referring now to the edge image 52 in FIG. 3B, every line within edge image 52 is first identified and traced. The lines within an edge image are usually single pixel lines because, as discussed above and in detail in the '243 Application, the finite state recognizer only sets pixels as edge pixels where a transition of N consecutive white pixels to N consecutive black pixels (or vice versa) occur, where N is greater than 1. As a result, conventional line tracing algorithms can be simplified in order to search for the single-pixel wide horizontal (or vertical) edge lines generated by the finite state analyzer.

To locate the lines within the edge image, the edge image is scanned pixel by pixel, preferably row by row from top to bottom, in the binary array containing the edge image. Each pixel that is traced is marked as "visited". Tracing a line involves locating the starting point of the line, and each consecutive point within the line until the ending point is identified. The starting point is defined as an asserted line pixel (i.e., a pixel set to "1") not previously "visited" that has only one asserted line pixel in its 8-connect neighbor. The pixel identified within the 8-connect neighbor becomes the current point, and its 8-connect neighbor is examined to locate the next point on the line (the pixel that was traced previously is ignored). Tracing of the current line continues pixel by pixel until a point is located which has no asserted line pixel its 8-connect neighbor, except for the previously traced pixel. This point is marked as the ending point of the current line. Scanning continues to locate the starting point of a new line from the point at which the last starting point left off, as described above. Once the starting point for a new line is found, the new line is traced as described above. This process continues until the edge image is completely scanned.

Preferably, if the length (i.e., the total number of pixels) of an identified line is less than a pre-defined threshold (10 pixels in the preferred embodiment), it is removed because it produces a less accurate slope calculation during the line fitting step discussed below. In addition, eliminating short line segments reduces the processing time for the line fitting step because a fewer number of lines are processed.

Figure 4:
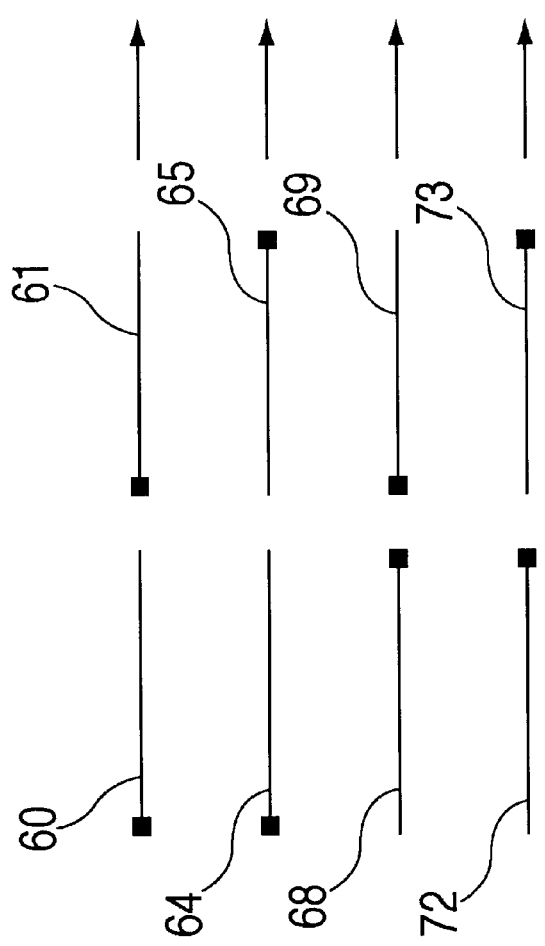
FIG. 4 is a diagram illustrating the rules for merging lines within the horizontal edge image in accordance with the present invention.

Also, preferably, if two line segments are found to be close to each other, they can be merged together to form a single line under one of the following scenarios, as shown in FIG. 4:

1. If the distance between the last point of first segment 60 and the first point of second segment 61 is below a predetermined threshold (4 pixels in the preferred embodiment), second segment 61 is appended to first segment 60 to create combined line 62.
2. If the distance between the last point of first segment 64 and the last point of second segment 65 is below the predetermined threshold, second segment 65 is reversed (meaning that the order of the pixels within segment 65, is reversed) and then appended to first segment 64 to create combined line 66.
3. If the distance between the first point of first segment 68 and the first point of second segment 69 is below the predetermined threshold, second segment 69 is reversed and first segment 68 is appended to reversed second segment 69 to create combined line 70.
4. If the distance between the first point of first segment 72 and the last point of second segment 73 is below the predetermined threshold, first segment 72 is appended to second segment 73 to create combined line 74.

Figure 5C:
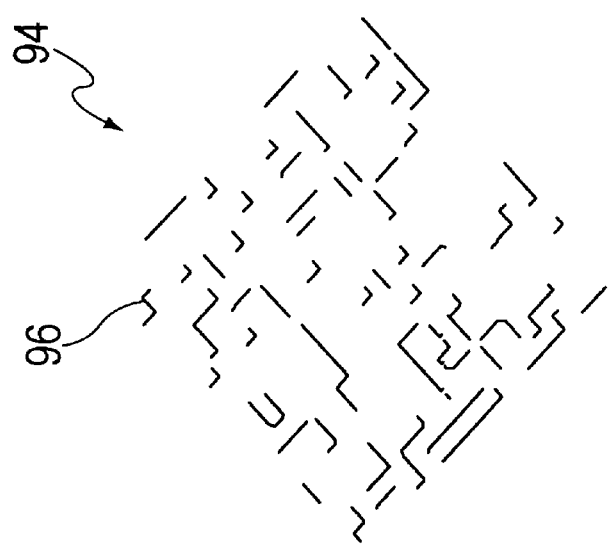
FIG. 5C is an illustration of a traced edge image having a skew angle of 45 degrees.
Figure 5B:
FIG. 5B is an illustration of a traced edge image having a skew angle of 30 degrees.
Figure 5A:
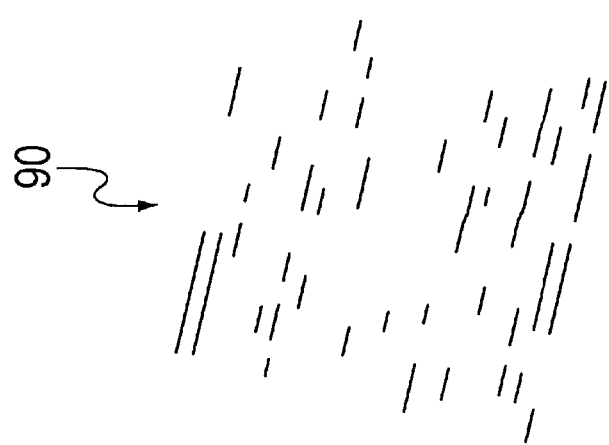
FIG. 5A is an illustration of a traced edge image having a skew angle of 15 degrees.

Examples of traced line segments derived from a horizontal edge image after line merging and short-line removal are shown in FIGS. 5A, 5B and 5C for two-dimensional barcodes having different skew angles. In particular, edge image 90 of FIG. 5A has a skew angle of 15°, edge image 92 of FIG. 5B has a skew angle of 30° and edge image 94 has a skew angle of 45°. As demonstrated by edge image 94 of FIG. 5C, lines having two perpendicular segments (e.g., segment 96) may be extracted by the horizontal edge detection process. The number of lines having perpendicular segments will increase as the skew angle approaches 45° and will decrease thereafter. After the line tracing process described above, two perpendicular segments representing the edges of the same data bit (which could occur, for example, when a black bit has white bits on two adjacent sides) are linked as one line segment because the pixels forming the corner fall within the 8-connect region of each other.

Figure 6:
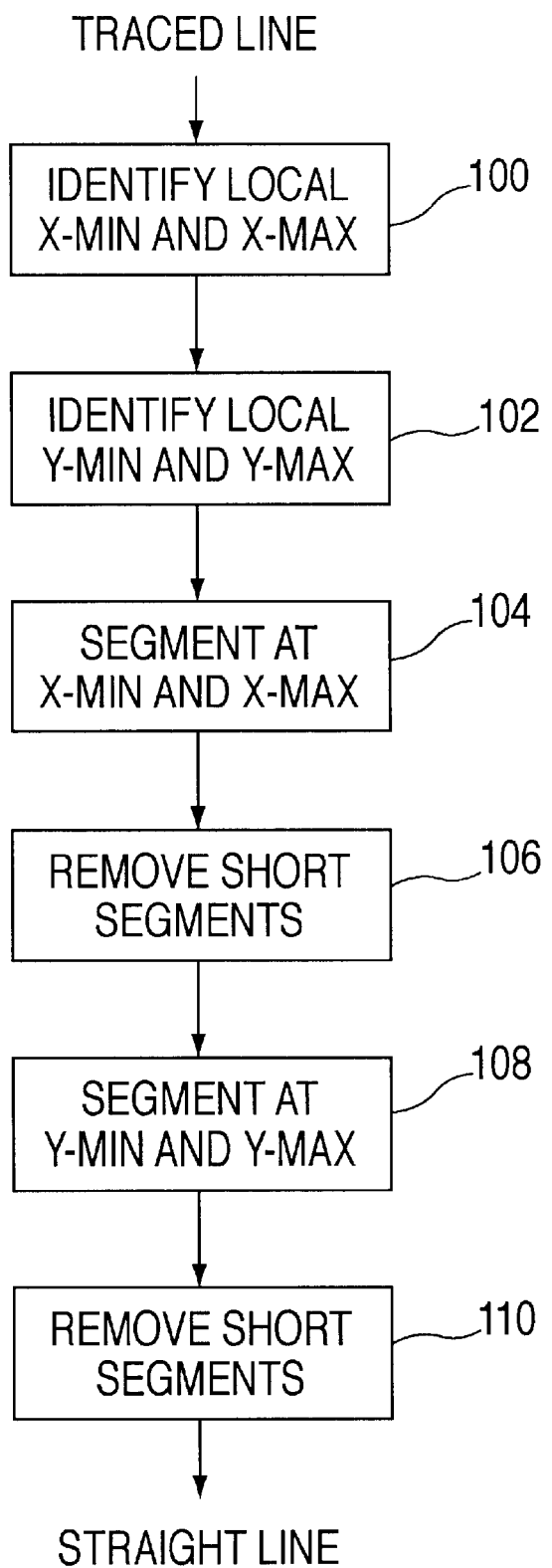
FIG. 6 is a flowchart describing the steps required for line segmentation in accordance with the present invention.
Figure 7:
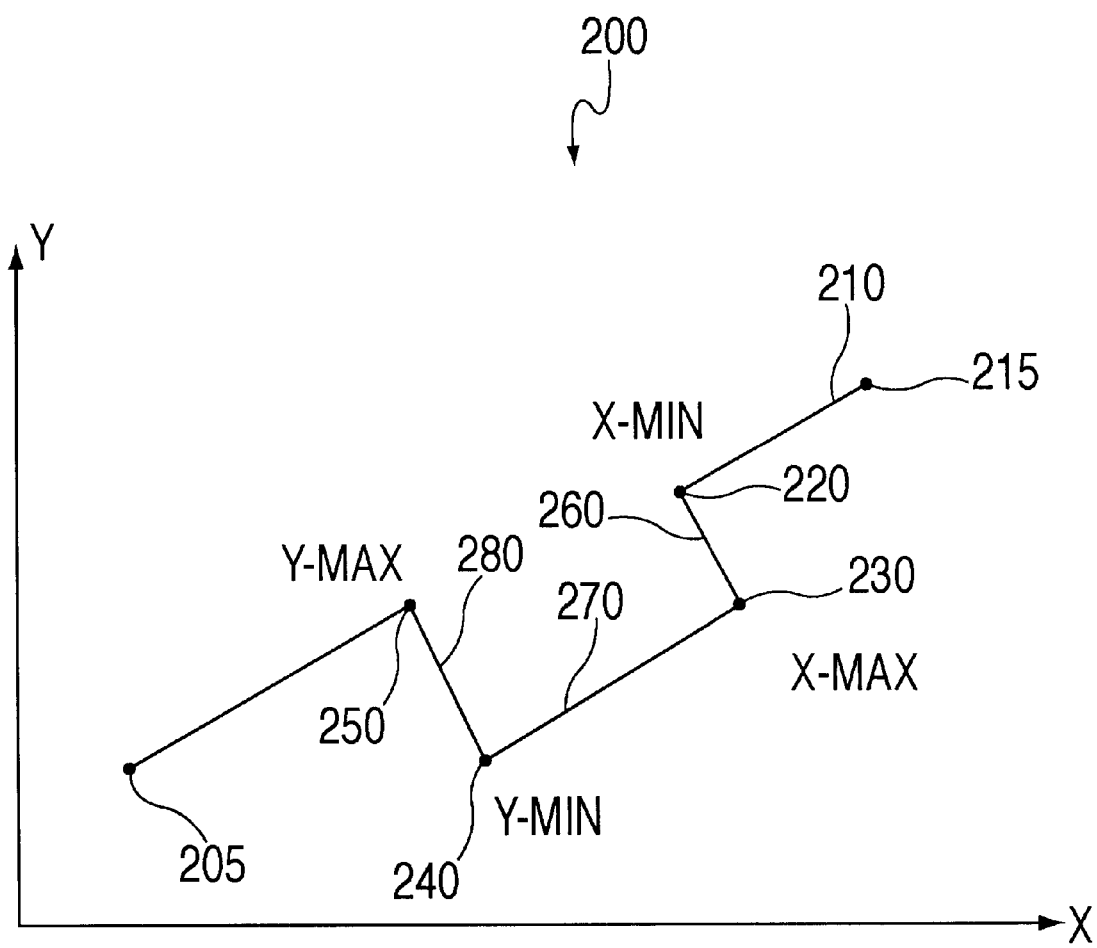
FIG. 7 is a graph illustrating the local x and y minima and maxima points on a line.
Figure 8A:
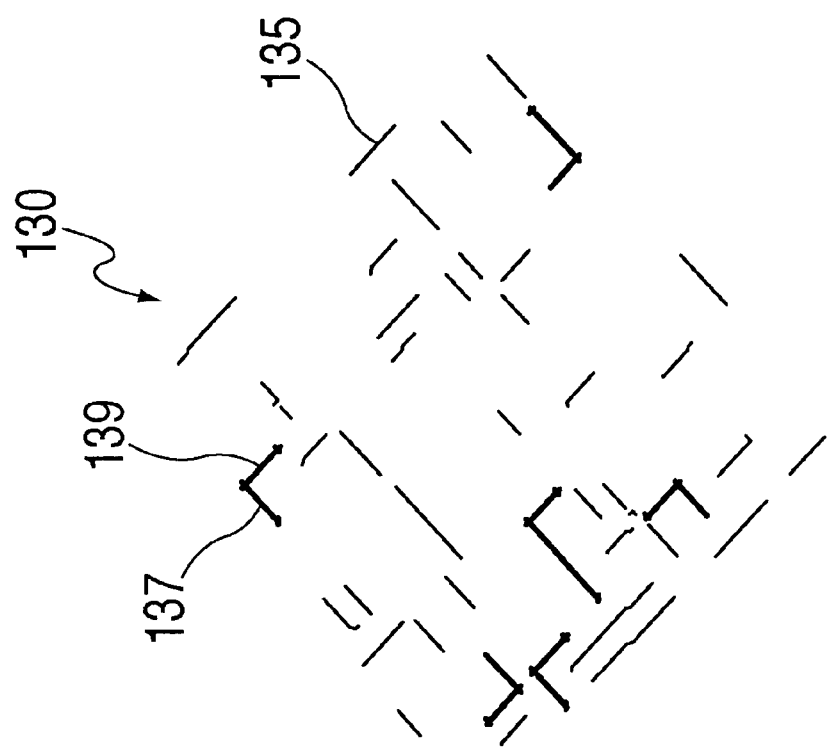
FIG. 8A is a diagram of a horizontal edge image before line segmentation.
Figure 8B:
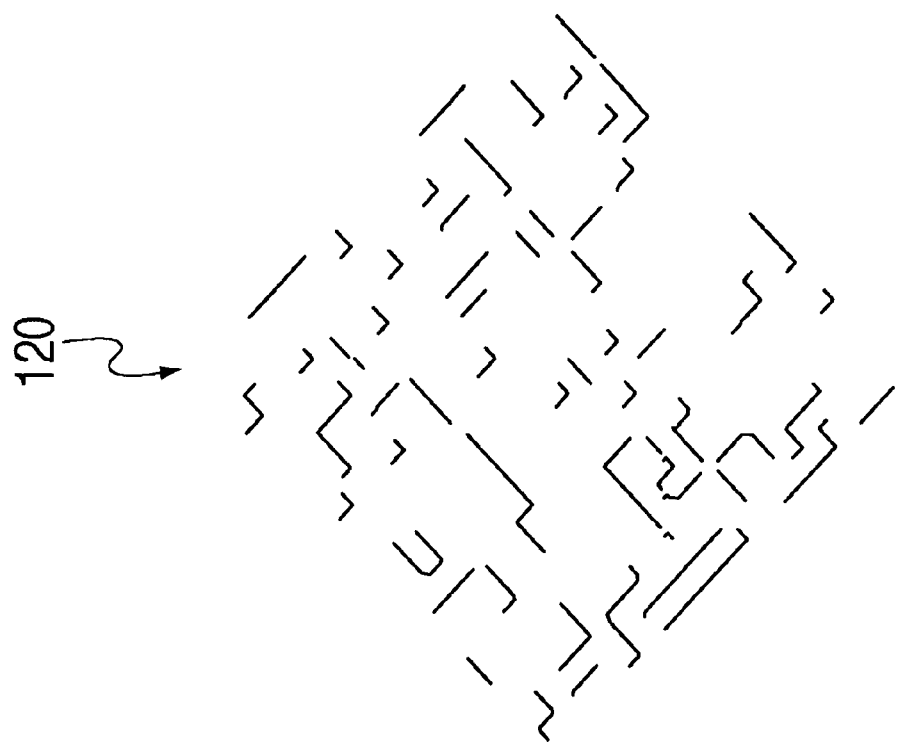
FIG. 8B is a diagram of a the same horizontal edge image after line segmentation.

For the present invention to operate properly, the edge image should contain only straight lines. Therefore, all perpendicularly-connected lines are split into two separate straight line segments at high curvature points or turning comers. In the preferred embodiment, the line segmentation algorithm shown in FIG. 6 is employed to separate the eliminate high curvature points and turning corners, such as appears in edge image 120 in FIG. 8A. Each line is first scanned from its starting point, e.g., point 205 in FIG. 7, to its ending point, e.g., point 215 in FIG. 7, to identify any local x-min and x-max points at step 100 and to identify any local y-min and y-max points at step 102. FIG. 7. is a graph 111 of a line 200 having an x-min 220, an x-max 230, a y-min 240 and a y-max 250. At step 104 of FIG. 6, the traced line is segmented at its x-min and x-max points. The separated segment (e.g., segment 260 in FIG. 7) is compared to a predetermined threshold to determine whether it should be removed as a short line segment (as above) in step 106. At step -108, the traced line is segmented at its y-min and y-max points. Finally, at step 110, the separated segments (e.g., segments 270 and 280 of FIG. 7) are compared to a predetermined threshold to determine whether they should be removed as a short line segment (as above) in step 110. The edge image 130 in FIG. 8B shows the line segments remaining after this processing. Once step 110 is completed, the curvature in the original traced line has been removed, and only straight line segments, such as segment 135 in edge image 130 of FIG. 8B, remain. The highlighted lines, e.g., segments 137 and 139, represent separate lines, and are not connected (each portion of the originally connected line was longer than the predetermined threshold), and thus remains in the edge image.

Ripple noise in a line may cause line segmentation to occur at points which are not barcode bit comers. To eliminate ripple noise from causing errors in the segmentation process described above, if an x-nin/x-max or y-min/y-max pair are very close to each other (i.e., fall within a predetermined threshold, 3 pixels in the preferred embodiment), segmentation is not performed.

After the lines within the edge image are traced, merged, segmented and noise is removed, the processed edge image contains only straight edge line segments of reasonable length, i.e., eligible edge lines, which are used to estimate the skew angle as follows.

In the preferred embodiment, the slope of each eligible edge line is estimated using line fitting techniques, although, as one reasonably skilled in the art will readily recognize, in some circumstances it may be possible to calculate the slope of only a portion of the eligible edge lines or even a single edge line. In the preferred embodiment, a majority rule is then applied to the slope distribution so that a more-accurate estimate of the skew angle is obtained. Line fitting, also called "linear regression", is used to fit a set of N points $(x_i, y_i)$, or N edge pixels, to the straight-line model:

$$y(x)=y(x;a,b)=a+b \cdot x \qquad (1)$$

If it is assumed that the uncertainty (i.e., weight) associated with each measurement $y_i$ is unavailable and that the $x_i$'s (i.e., the values of the dependent variable) are known exactly, the line fitting problem turns into the following minimizing equation:

$$\chi^2(a, b) = \sum_{i=1}^{N} (y_i - a - b \cdot x_i)^2 \qquad (2)$$

to determine a and b.

One solution for this equation is described in W. Press et al., Numerical Recipes in C, Cambridge University Press, 1992 as follows:

$$b = \frac{1}{S_{tt}} \sum_{i=1}^{N} t_i \cdot y_i \qquad (3)$$

$$a = \frac{S_y - S_x \cdot b}{S} \qquad (4)$$

where $$S_{tt} = \sum_{i=1}^{N} t_i^2$$

$$t_i = x_i - \frac{S_x}{N}$$

$$S_x = \sum_{i=1}^{N} x_i.$$

In the preferred embodiment of the present invention, for each segmented edge line, all pixels on the particular line being examined, except for the first two pixels and last two pixels, are used for the line fitting. The exclusion of the first two pixels and the last two pixels is done to reduce any adverse effects caused by unstable pixels at either the logical bit comers or the cut point from line segmentation.

In practice, only b needs to be calculated since it alone represents the slope of the line being fitted. In the present invention, the slope of each line segment is obtained using equation (5):

$$\alpha = \arctan(b) \qquad (5)$$

where $$\alpha \in \left(-\frac{1}{2}\pi, \frac{1}{2}\pi\right).$$

A positive angle indicates a skew clockwise and a negative angle indicates a skew counter-clockwise.

Each eligible edge line yields a slope estimate between $-\frac{1}{2}\pi$ and $\frac{1}{2}\pi$. First, these angle values are converted to discrete values according to the desired precision. For example, if the desired precision is 0.5°, all angle values will be converted to its nearest 0.5°. A 0.50° conversion for an angle a can be expressed as follows:

$$\alpha' = \frac{|\alpha|}{\alpha} \begin{cases} [|\alpha|] + 1.0 & \text{if } f \geq 0.75 \\ [|\alpha|] + 0.5 & \text{if } 0.25 \leq f < 0.75 \\ [|\alpha|] & \text{if } f < 0.25 \end{cases} \qquad (6)$$

where α' is the new converted angle at 0.5° resolution, $f=|\alpha|-[|\alpha|]$, i.e., f is the fractional part of α, and the "[x]" operator is the floor function which computes the largest integral value not greater than x. Thus, for example, if x=4.2, then [x]=4.0.

Figure 9:
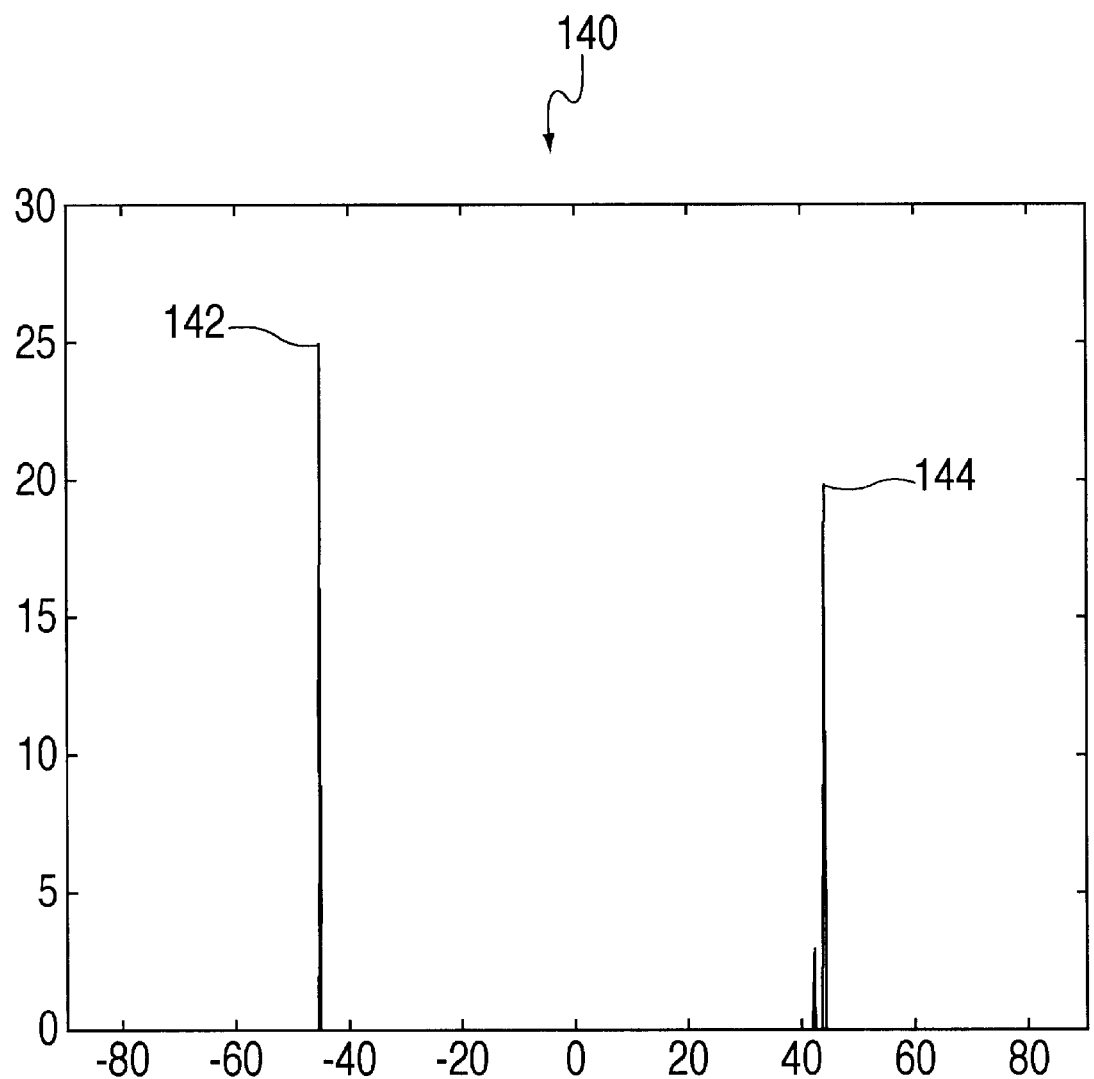
FIG. 9 is a histogram of the skew angles determined in accordance with the present invention.

Preferably, as shown in FIG. 9, a discrete histogram 140 can be generated from the calculated discrete line slopes (which each represent an estimate of the skew angle). As one reasonably skilled in the art will readily recognize, however, other methods may be employed to select the skew angle from this set of line slopes. The x-axis of histogram 140 is the skew angle, and the y-axis of histogram 140 is the number of times. that the particular skew angle was calculated. The x-axis resolution is the pre-defined precision, e.g., 0.50° in the preferred embodiment. Histogram 140 of FIG. 9 shows the skew angle distribution for the edge lines. (e.g., line 135) in edge image 130 of FIG. 8B.

To determine the, skew angle in the preferred embodiment, the majority is selected and therefore, the angle that yields the highest histogram value is the estimated skew angle. Referring to FIG. 9, two peaks 142 and 144 are clearly shown at −45° and 45° which indicate two majority groups of perpendicular lines. Because the angle −45° yields greater value in the histogram, the skew angle of two-dimensional barcode 130 of FIG. 8B is estimated as −45°. The deskewing procedure will then rotate the barcode by 45° to obtain a substantially straight barcode. By examining the slope of every eligible edge line within the edge image, the effect of drawn line noise is greatly reduced, since a drawn line is likely to only contribute one value to the histogram, and there will be a plurality of slopes in the histogram due to the plurality of eligible edge lines within the edge image.

Note that in a case such as that shown in FIG. 9, where there are two perpendicular lines 142 and 144 that have equal skew angles, but with opposite signs, the peak which yields a greater value is not critical because the deskewing procedure for a skew angle of either −45° or +45° will both yield a straight two-dimensional barcode. As discussed in detail in the '189 Application, the reading process for the two-dimensional barcode disclosed therein reads the data in all four possible orientations, and selects for output the data from the orientation which yields the least number of errors during the post-processing step. Thus, it does not matter whether the barcode is deskewed by +45° or −45°, both will produce an accurate output, after post-processing.

In another embodiment, the skew angle can be determined by calculating the average of the most likely candidates. The most likely candidates are selected based upon the distribution of the skew angle values, which are assumed to be Gaussian. Because this distribution is Gaussian, its probability density function is:

$$p(k) = -\frac{1}{\sqrt{2\pi} \cdot \sigma} e^{-\frac{(x_k-\mu)^2}{2\sigma^2}} \qquad (7)$$

where $\mu$ is the mean, $\sigma$ is the variance of the distribution, $\{X_k | 1 \leq k \leq n\}$ are the slopes of the eligible edge lines within the edge image and n is the total number of skew angle measurements.

Figure 10:
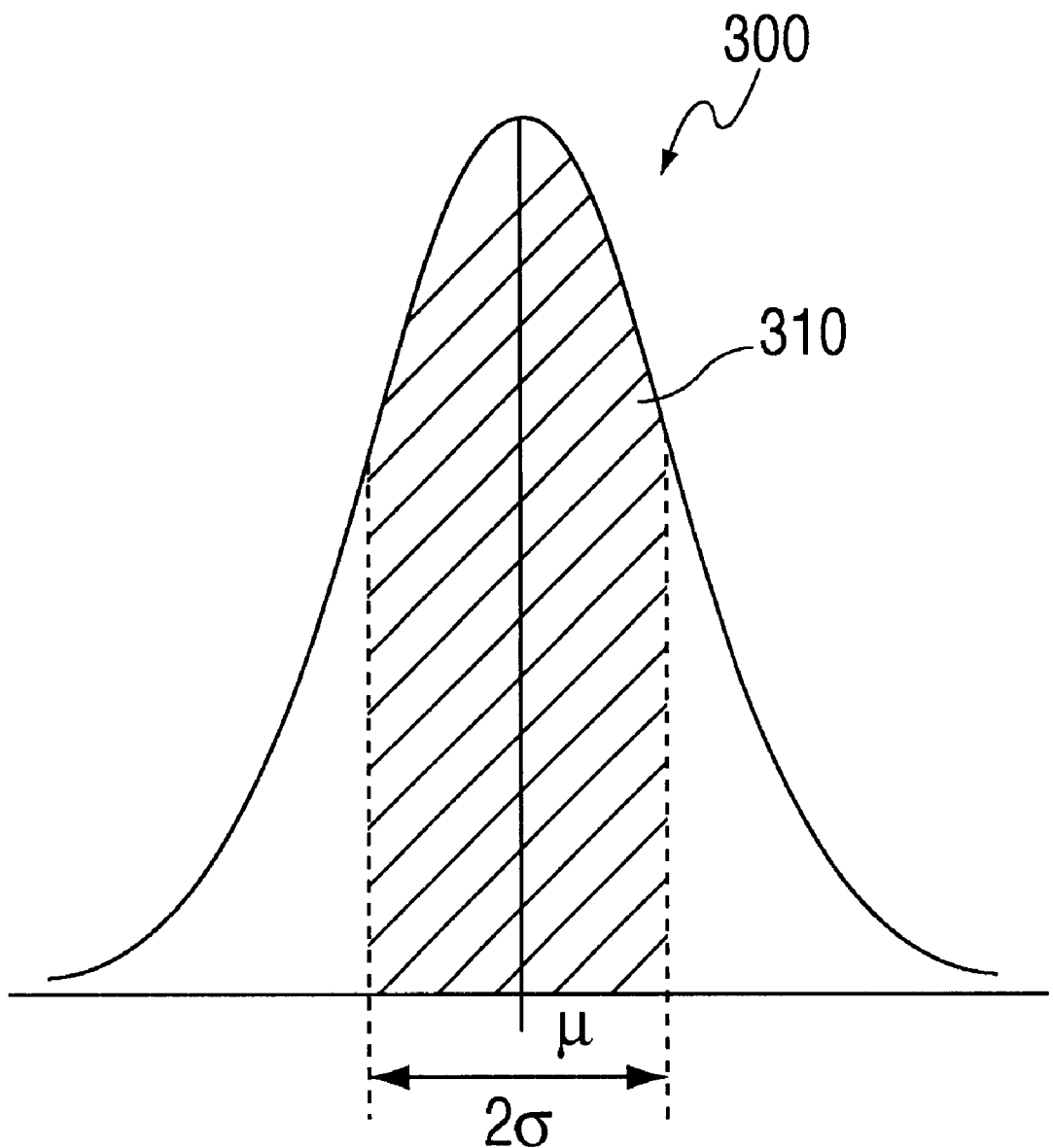
FIG. 10 is a graph of a Gaussian distribution.

Referring now to the graph 300 of a the Gaussian distribution shown in FIG. 10, the power in the shaded region 310 having a boundary ($\mu-\sigma, \mu+\sigma$) contributes almost 70% of the entire power in the Gaussian distribution. Therefore, a most likely candidate region is defined as:

$$[\hat{\mu}-\hat{\sigma}, \hat{\mu}+\hat{\sigma}] \qquad (8)$$

where $\hat{\mu}$ and $\hat{\sigma}$ are estimates of $\mu$ and $\sigma$. To calculate $\hat{\mu}$ and $\hat{\sigma}$, since it is desired to minimize the square root error, E, represented by the following equation:

$$E = \sum_{k=1}^{n} (x_k - \hat{\mu})^2 \qquad (9)$$

the value for $\hat{\mu}$ can be set as:

$$\hat{\mu} = \frac{1}{n} \sum_{k=1}^{n} x_k \qquad (10)$$

and therefore $\hat{\sigma}$ can be calculated from the equation:

$$\hat{\sigma}^2 = \frac{1}{n} \sum_{k=1}^{n} x_k^2 - \hat{\mu}^2 \qquad (11)$$

The skew angle is estimated as the average of the most likely candidates (i.e., only the skew angle values falling below the shaded area 310, and thus the skew angle $\alpha$ can be calculated as:

$$\alpha = avg(\{x_k - [\hat{\mu}-\hat{\sigma}, \hat{\mu}+\hat{\alpha}]\}) \qquad (12)$$

where avg is the averaging function.

In yet another embodiment, a majority region for the skew angle distribution can be obtained from the histogram of the eligible edge line slopes by moving a sliding window across the histogram, and determining the location within the histogram where, the sum of the number of slopes is greatest. This position is designated the majority region, and the skew angle is calculated as the average of the values within the majority region.

In a further embodiment, the skew angle can be chosen as the average of all of the eligible edge line slopes. Likewise, the median value of the eligible edge line slopes may be chosen as the skew angle.

Finally, in yet a further embodiment, the slope of the longest edge line within the edge array may be used as the skew angle value. Since this method is sensitive to line noise within the barcode, the edge image can be divided into separate regions, e.g., top, middle and bottom, and then the slope of the longest line within each region is calculated. The median value of the calculated slopes can then be chosen as the skew angle.

While the present invention has been particularly shown and described with reference to the preferred embodiments and various aspects thereof, it will be appreciated by those of ordinary skill in the art that various changes and modifications may be made without departing from the spirit and scope of the invention. It is intended that the appended claims be interpreted as including the embodiments described herein, the alternatives mentioned above, and all equivalents thereto.

What is claimed is:

1. A method of calculating a skew angle for a bitmap of rows and columns of data pixels forming a two-dimensional barcode, comprising the steps of:

locating horizontal or vertical edges within said two-dimensional barcode, each of said edges forming a boundary between a data pixel of a first color within said two-dimensional barcode and a data pixel of a second color within said two-dimensional barcode that is different from said first color, and generating an edge array identifying said horizontal or vertical edges;

tracing edge lines within said edge array by locating a starting point within each of said edge lines and then identifying each consecutive point within each of said edge lines;

calculating a slope for each edge line within said edge array;

generating a discrete histogram of said slopes; and setting the skew angle as the highest value within said discrete histogram.

2. The method of claim 1, further comprising, subsequent to said step of identifying and tracing edge lines, the step of merging edge lines within said edge array which are located within a first predetermined threshold of each other together to form a single line.

3. The method of claim 1, further comprising, subsequent to said step of identifying and tracing edge lines, the step of eliminating edge lines within said edge array having a length less than a second predetermined threshold.

4. The method of claim 1, wherein said slope of each edge line is calculated using linear regression techniques.

5. The method of claim 1, wherein a finite-state recognizer is used to locate said horizontal or vertical edges.

6. The method of claim 1, further comprising, subsequent to said step of identifying and tracing edge lines, the step of separating segments of said edge lines within said edge array which are perpendicularly connected.

7. A method of calculating a skew angle for a bitmap of rows and columns of data pixels forming a two-dimensional barcode, comprising the steps of:

locating horizontal or vertical edges within said two-dimensional barcode, each of said edges forming a boundary between a data pixel of a first color within said two-dimensional barcode and a data pixel of a second color within said two-dimensional barcode that is different from said first color, and generating an edge array identifying said horizontal or vertical edges;

tracing edge lines within said edge array by locating a starting point within each of said edge lines and then identifying each consecutive point within each of said edge lines;

calculating a slope for an edge line within said edge array;

setting the skew angle as the slope of said edge line.

8. The method of claim 7, further comprising, subsequent to said step of identifying and tracing edge lines, the step of merging edge lines within said edge array which are located within a first predetermined threshold of each other together to form a single line.

9. The method of claim 7, further comprising, subsequent to said step of identifying and tracing edge lines, the step of eliminating edge lines within said edge array having a length less than a second predetermined threshold.

10. The method of claim 7, wherein said slope of each edge line is calculated using linear regression techniques.

11. The method of claim 7, wherein a finite-state recognizer is used to locate said horizontal or vertical edges.

12. The method of claim 7, further comprising, subsequent to said step of identifying and tracing edge lines, the step of separating segments of said edge lines within said edge array which are perpendicularly connected.

13. A method of calculating a skew angle for a bitmap of rows and columns of data pixels forming a two-dimensional barcode, comprising the steps of:

locating horizontal or vertical edges within said two-dimensional barcode, each of said edges forming a boundary between a data pixel of a first color within said two-dimensional barcode and a data pixel of a second color within said two-dimensional barcode that is different from said first color, and generating an edge array identifying said horizontal or vertical edges;

tracing edge lines within said edge array by locating a starting point within each of said edge lines and then identifying each consecutive point within each of said edge lines;

calculating a slope for each edge line within said edge array;

intelligently selecting the skew angle from said slopes of said edge lines.

14. The method of claim 13, further comprising, subsequent to said step of identifying and tracing edge lines, the step of merging edge lines within said edge array which are located within a first predetermined threshold of each other together to form a single line.

15. The method of claim 13, further comprising, subsequent to said step of identifying and tracing edge lines, the step of eliminating edge lines within said edge array having a length less than a second predetermined threshold.

16. The method of claim 13, wherein said slope of each edge line is calculated using linear regression techniques.

17. The method of claim 13, wherein a finite-state recognizer is used to locate said horizontal or vertical edges.

18. The method of claim 13, further comprising, subsequent to said step of identifying and tracing edge lines, the step of separating segments of said edge lines within said edge array which are perpendicularly connected.

* * * * *